Feb. 2, 1971   P. LAURENT   3,560,980
POSITION FINDING SYSTEM
Filed April 4, 1969
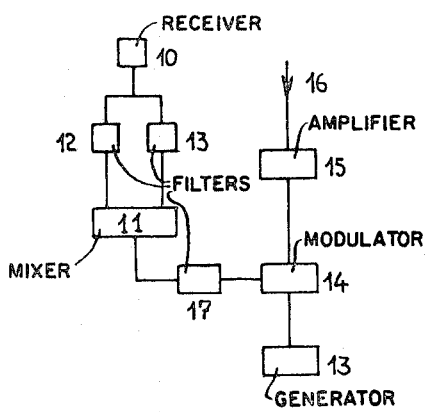
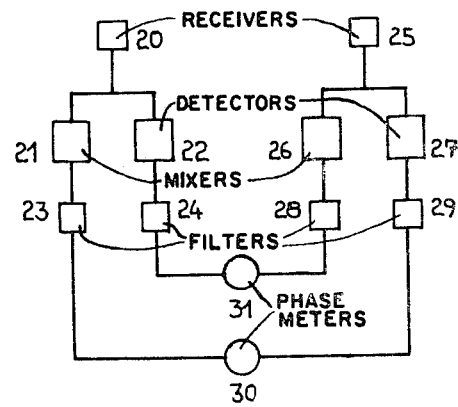
Fig.1 PRIOR ART
Fig.2
Fig.3
Fig.4

United States Patent Office 3,560,980
Patented Feb. 2, 1971

3,560,980
POSITION FINDING SYSTEM
Pierre Laurent, Fontenay-aux-Roses, France, assignor to Sercel Societe d'Etudes, Recherches et Constructions Electroniques, Carquefou, France, a French company
Filed Apr. 4, 1969, Ser. No. 813,433
Claims priority, application France, Apr. 11, 1968, 147,733
Int. Cl. G01s 1/34
U.S. Cl. 343—105                                1 Claim

ABSTRACT OF THE DISCLOSURE

A position finding system is provided which comprises four transmitting stations, a first pair of which produces a first hyperbolic position line system and a second pair of which produces a second intersecting hyperbolic position line system. First transmitters of each pair transmit unmodulated high frequency waves in first and second channels respectively and second transmitters of each pair transmit high frequency carrier waves in the first and second channels respectively, each carrier wave being modulated with a degree of modulation less than 1 by a different low frequency. The modulation of the second transmitter of the first pair is equal to the beat frequency of the high frequency unmodulated and carrier waves of the second channel and the modulation of the second transmitter of the second pair is equal to the beat frequency of the high frequency unmodulated and carrier waves of the first channel.

---

The present invention concerns a position finding system of the type in which a craft, for example a ship, carries a receiver which derives from radio waves transmitted from a network of fixed stations equal frequencies whose phase difference gives a position line.

A conventional system of this type is indicated by FIG. 1, of the accompanying drawings. A first transmitter situated at a fixed point $A_1$ of known location radiates a pure high-frequency wave $F_1$, and a second transmitter situated at a second fixed point $B_1$, also of known location, radiates a pure high-frequency wave $F_2$ differing from $F_1$ by a low frequency $f$. A unit situated at a third fixed point $C_1$ receives the two waves $F_1$ and $F_2$ and derives from them the low beat frequency $f$. This wave of frequency $f$ serves to modulate a third transmitter situated at $C_1$ and radiation a wave $F_3$ different from $F_1$ and $F_2$.

A first channel of a receiver aboard the craft whose position is to be determined receives the waves emanating from $A_1$ and $B_1$ and causes them to beat, which gives a first beat frequency of value $f$. A second channel receives the modulated wave coming from $C_1$ and detects it, which gives a second wave of frequency $f$. A phase meter measures the phase difference between these two waves of frequency $f$, this measurement giving a hyperbolic position line on which the receiver is situated.

In this well-known system, the value of the high frequency $F_3$ emitted from $C_1$ and its phase perform no function, this wave serving only to carry the information consisting of the phase of the voltage which modulates it. Also, this system uses two frequency channels, one containing the frequencies $F_1$ and $F_2$ and the other the frequency $F_3$.

In order to obtain a fix, it is necessary to use two systems similar to that described above and although one of the transmitters of the second system may be identical with one of the transmitters of the first system, at least three channels are necessary for obtaining a fix.

The object of the present invention is to reduce the number of channels necessary for obtaining a fix and it achieves this result mainly by converting some of the transmitting stations of each system into stations which transmit, not pure waves, but modulated waves.

It is known that, if a partial modulation and not a total modulation of a wave is effected, two items of phase information can be carried, i.e. one item of information consisting of the phase of the unmodulated part of the transmitted high-frequency carrier wave and one item of information consisting of the phase of the modulation voltage carried by the carrier wave. In other words, a wave of frequency F which is modulated with a degree of modulation of less than 1 by a frequency $f$ is equivalent to an unmodulated wave of frequency F and to two side bands of frequency:

$$F-f \text{ and } F+f$$

these side bands only carrying the information regarding the phase of the modulation voltage, and the phase of the carrier wave of frequency F not being changed by the fact that it is modulated. This fact is utilized by the invention.

According to the present invention there is provided a position finding system of the type described wherein there are four transmitting stations, a first pair of which gives a first hyperbolic position line system and a second pair of which gives a second, intersecting hyperbolic position line system, first transmitters of each pair transmitting unmodulated high frequency waves in first and second channels respectively, and second transmitters of each pair transmitting high frequency carrier waves in said first and second channels respectively, each carrier wave being modulated with a degree of modulation less than one by a different low frequency, the modulation of the second transmitter of the first pair being equal to the beat frequency of the high frequency unmodulated and carrier waves of the second channel and the modulation of the second transmitter of the second pair being equal to the beat frequency of the high frequency unmodulated and carrier waves of the first channel.

For a better understanding of the present invention and to show how the same may be carried into effect, reference will now be made, by way of example, to the remaining figures of the accompanying drawing, in which:

FIG. 2 is a diagram of the locations of transmitting stations.

FIG. 3 is a block circuit diagram of a receiving and transmitting unit at the station B of FIG. 2, and FIG. 4 is a block circuit diagram of a receiver carried by a ship or vessel whose position is to be determined.

In FIG. 2, four transmitters are situated at the points A, B, C and D, the geographical positions of which points are appropriately chosen so that two systems of hyperbolae can be obtained that will completely cover the area in which it is desired to be able to find positions.

The transmitter situated at A radiates a pure unmodulated wave of frequency $F^1_a$. The transmitter situated at B radiates a wave of frequency $F^2_a$ modulated by a wave of frequency $fb$, the value of which is defined below. The frequencies $F^1_a$ and $F^2_a$ are so chosen that the difference $F^1_a - F^2_a$ is equal to a low frequency of value $fa$, and the the waves transmitted from A and B serve to create a first system of hyperbolae with foci at A and B.

The wave transmitted by the transmitter at C is a pure, unmodulated wave of frequency $F^1_b$ and the wave transmitted from D is a wave $F^2_b$ modulated by a wave whose irequency is equal to the above-defined frequency $fa$. The frequencies $F^1_b$ and $F^2_b$ are such that $F^1_b - F^2_b$ is equal to a low frequency of value $fb$, and the waves transmitted from C and D serve to create a second system of hyperbolae with foci at C and D. The frequencies $F^1_a$ and $F^1_b$ are distinctly different from one another, so that their difference is not equal to a low frequency, but to a high frequency.

It will thus be seen that there are only two channels, one containing $F^1_a$ and $F^2_a$ modulated and the other $F^1_b$ and $F^2_b$ modulated. This gives the above-mentioned advantage of two systems of hyperbolae using four frequencies contained in only two channels.

In order to effect the modulation of the waves radiated by the transmitters at B and D, the following procedure is adopted. A receiver situated in the neighborhood of B receives the transmissions from C and D, which is simple since these waves are distinctly different from the wave transmitted by B. This receiver isolates, by means of appropriate filters, the carrier wave transmitted from D to the exclusion of the side bands and causes it to beat with the wave transmitted from C, which results in the creation of a beat wave of value $fb$ and it is this beat wave which modulates, by any known method, the wave transmitted from B.

Likewise, there is attached to the transmitting station situated at D a receiver which receives the waves transmitted from A and B. This receiver isolates the carrier wave transmitted from B and causes it to beat with the wave transmitted from A, which results in the creation of a wave $fa$ which serves to modulate the wave transmitted from D.

Referring to FIG. 3, a receiver 10 receives the waves transmitted from C and D, this receiver feeding a mixer 11 on the one hand through a filter 12 which passes only the frequency $F^1_b$ and on the other hand through a filter 13 which passes only the frequency $F^2_b$ of the carrier wave transmitted from D to the exclusion of the side bands.

The mixer 11 supplies the beat frequency $fb$ which serves to modulate in a modulator 14 the wave of frequency $F^2_a$ supplied by a generator 13. The wave modulated at the output of the modulator 14 is amplified by an amplifier 15 and is radiated by an antenna 16.

It is obviously essential that the frequency $fa$ should not be able to reach the modulator 14 through the members 10, 11, 12 and 13. To this end, a rejection filter such as 17 is interposed between the mixer 11 and the modulator 14. This rejection filter completely prevents all transmission of a modulation frequency $fa$ to the modulator 14.

The receiving and radiating unit situated at D is of similar construction to that of the unit situated at B.

FIG. 4 shows the main components of the receiver aboard the craft whose position it is desired to determine. This receiver comprises a first receiving channel 20 tuned to the frequency band containing $F^1_a$, $F^2_a$ and the side bands $F^2_a-fb$ and $F^2_a+fb$. This channel 20 feeds a mixer 21 which supplies at its output the frequency $fa$ resulting from the beating of $F^1_a$ and $F^2_a$. In addition, this channel 20 feeds a detector 22 which supplies at its output the frequency $fb$ resulting from the detection of the wave $F^2_a$ modulated by $fb$. The mixer 21 is followed by a filter 23 tuned to $fa$ and preventing $fb$ from passing. Likewise, the detector 22 is followed by a filter 24 which passes only $fb$ to the exclusion of $fa$.

The second channel 25 receives the waves $F^1_b$, $F^2_b$ and the side bands $F_b-fa$ and $F_a+fa$. A mixer 26 fed by channel 25 supplies the frequency $fb$, and a detector 27, which is also fed by channel 25, supplies the frequency $fa$. A filter 28 situated at the output of the mixer 26 passes only $fb$, and a filter 29 at the output of the detector 27 passes only $fa$. The outputs of the filters 23 and 29 are connected to the input of a phase meter 30 which measures the phase difference between two currents of frequency $fa$. This phase difference is related to the system of hyperbolae having the points A and B as their foci. The outputs of the filters 24 and 28 are applied to a second phase meter 31 which measures the phase difference between two currents of frequency $fb$, this phase difference being related to the system of hyperbolae having their foci at C and D.

The operation of the system according to the invention will readily be deduced from that of the conventional system initially described. It will be noted that the stations B and D each perform a double function; for example the station D performs, for the first network consisting of the transmitters at A and B, the function of the station $C_1$ of FIG. 1, by virtue of the phase of the modulation voltage of the wave which it radiates, and it also performs, by means of the phase of its carrier wave, the function of the station $B_1$ of FIG. 1 in regard to the second network consisting of the stations C and D. The station B performs a function which is symmetrical to that of the station D.

The values of the low frequencies $fa$ and $fb$ will obviously be so chosen that these two low frequencies are readily separable; for example, $fa$ could be 80 c./s. and $fb$ 130 c./s.

It will be noted that the transmitters, which are preferably quartz-stabilized, are neither slaved to one another nor synchronized with one another.

In a modification, the beat wave $fa$ which may be available at B is utilized, this wave emanating from the detection of the wave radiated by D. This makes it possible to adjust the frequency $F^2_a$ in such manner that $fa$ takes exactly the desired value. This may be done, for example, by comparing the value of the frequency thus detected with that of a local generator of frequency $fa$.

It is also possible to utilize the signal thus detected for controlling by methods known per se the frequency $F^2_a$ in such manner that $fa$ retains a given value.

What has been stated in the foregoing concerning the station B may also be repeated for the station D in regard to $fb$.

Finally, it is possible to provide additional members for maintaining between $fa$ and $fb$ a pre-set relation, for example $k_1 fa = k_2 fb$, the factors $k_1$ and $k_2$ having well-defined fixed values.

What is claimed is:

1. In a position finding system having transmitters at fixed stations for transmitting radio waves of different high frequencies forming two sets, each of which provides a low frequency, on the one hand from beating two high frequencies and on the other hand from a modulated high frequency, these two sets corresponding to different frequencies, and a receiver at the point whose position is to be determined which derives from the low frequency of the first set a phase difference signal giving a first position line and from the low frequency of the second set a phase difference signal giving an intersecting second position line and thereby a fix, wherein the improvement comprises four transmitters which in combination provide both said sets, a first pair of which gives a first hyperbolic position line system and a second pair of which gives a second intersecting hyperbolic position line system, first transmitters of each pair transmitting unmodulated high frequency waves in first and second channels respectively, and second transmitters of each pair transmitting high frequency carrier waves in said first and second channels respectively, each carrier wave being modulated with a degree of modulation less than one by a different low frequency, the modulation of the second transmitter of the first pair being equal to the beat frequency of the high frequency unmodulated and carrier waves of the second channel and the modulation of the second transmitter of the second pair being equal to the beat frequency of the high frequency unmodulated and carrier waves of the first channel.

References Cited

UNITED STATES PATENTS 2,974,318    3/1961    Koeppel _____ 343—105(H)

RICHARD A. FARLEY, Primary Examiner

R. E. BERGER, Assistant Examiner